United States Patent
Eick et al.

(10) Patent No.: US 8,982,664 B2
(45) Date of Patent: Mar. 17, 2015

(54) OPTIMAL SOURCE SIGNATURE DETERMINATION

(75) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 750 days.

(21) Appl. No.: 13/191,872

(22) Filed: Jul. 27, 2011

(65) Prior Publication Data

US 2012/0033529 A1 Feb. 9, 2012

Related U.S. Application Data

(60) Provisional application No. 61/371,389, filed on Aug. 6, 2010.

(51) Int. Cl.
  *G01V 1/28* (2006.01)
(52) U.S. Cl.
  CPC .............. *G01V 1/28* (2013.01); *G01V 2210/10* (2013.01); *G01V 2210/55* (2013.01)
  USPC .......................................................... 367/38
(58) Field of Classification Search
  CPC ............ G01V 1/005; G01V 1/37; G01V 1/28
  USPC ..................................... 367/23, 38
  See application file for complete search history.

(56) References Cited

U.S. PATENT DOCUMENTS

| | | | |
|---|---|---|---|
| 5,995,905 A | 11/1999 | Ikelle et al. | |
| 7,072,767 B2 | 7/2006 | Routh et al. | |
| 2009/0010103 A1 | 1/2009 | Sallas et al. | |
| 2010/0018718 A1 | 1/2010 | Krebs et al. | |
| 2010/0039894 A1* | 2/2010 | Abma | 367/52 |
| 2010/0271904 A1* | 10/2010 | Moore et al. | 367/73 |

OTHER PUBLICATIONS

Moore et al., "Simultaneous source separation using dithered sources," SEG Las Vegas 2008 Annual Meeting, pp. 2806-2810.*
PCT/US2011/045500 PCT International Search Report (PCT/ISA/210) dated Dec. 9, 2011.

* cited by examiner

*Primary Examiner* — Ian J Lobo
(74) *Attorney, Agent, or Firm* — ConocoPhillips Company

(57) ABSTRACT

The invention relates to processing seismic data that includes signals from at least two sources and typically three or four sources where source separation is necessary for geophysical analysis. Specifically, the present invention is an analytical technique that quickly creates a more accurate source signature delivered by analysis of the source generated data contamination present in the separated data. The technique is to invert a segment of the data using a seed source signature and compute an error that reflects the generated data contamination observed in the separated source data. The source signature is iteratively revised as the segment is continually inverted with the goal of finding the optimal source signature that provides the lowest computed error. The source signature that provides the lowest error is, or is very close to, the true source signature and is then used in the separation process for the entire composite data set. This will provide much more information for geophysical interpretation.

17 Claims, 4 Drawing Sheets

OPTIMAL SOURCE SIGNATURE DETERMINATION

CROSS-REFERENCE TO RELATED APPLICATIONS

This application is a non-provisional application which claims benefit under 35 USC §119(e) to U.S. Provisional Application Ser. No. 61/371,389 filed Aug. 6, 2010, "Entitled Optimal Source Signature Determination," which is incorporated herein in its entirety.

STATEMENT REGARDING FEDERALLY SPONSORED RESEARCH OR DEVELOPMENT

None.

FIELD OF THE INVENTION

This invention relates to seismic exploration and particularly to inputting seismic energy into the ground using seismic vibrators.

BACKGROUND OF THE INVENTION

In the process of acquiring seismic data, it is conventional to use a seismic vibrator to input seismic energy into the ground. Seismic energy is generally applied over time where the vibrators begin a sweep by vibrating initially at a low frequency and progressively increase the frequency such that an entire sweep of the frequency range is delivered within a definite time. Sweeps of four to eight seconds have been standard practice for years, but longer sweeps are becoming increasingly common with sixteen second sweeps and twenty four second sweeps also being used.

The costs for a seismic survey can be quite expensive and much effort has gone into improving the efficiency of seismic surveying. One advance is to operate several seismic vibrators at the same time all making a similar sweep, but at different phases with respect to one another. In other words, if the baseplate of one vibrator were to be going up while another is going down, the two vibrators would be about 180 degrees out of phase. Operating four vibes that are out of phase with respect to one another is known and commercially in use as the HFVS or ZenSeis® geophysical prospecting system among others. Thus, commonly four (or some other number of) vibrators can be delivering seismic energy at one time and are each identifiable in the recordings from all of the seismic receivers. Typically, with four vibrators, at least four separate sweeps are performed where the phase relationship between the vibrators is changed between sweeps to enhance the distinctiveness of each vibrator in the data record.

It has also been recognized that being out of phase at an orthogonal relationship to one another is not the most distinctive. If one vibrator is at zero degrees phase and the next vibrators is 90 degrees ahead, the next is 180 degrees ahead and the last is 270 degrees ahead, this combination is described as orthogonal where everything is 90 or 180 degrees different from one another. In this arrangement, echoes and harmonics from the subsurface geological structures are created and are somewhat difficult to distinguish from the principal reflections. So, it is preferred that phase differences are non-orthogonal which makes the phase differences between at least two of the four vibrators to be less than 90 degrees. Unfortunately, equipment and circumstances are never perfect and vibrators that are supposed to be out of phase may actually operate at a phase difference that becomes difficult to distinguish due to equipment drift or wear and tear. In this circumstance, it may not be apparent to the operators that the phase excursion has happened until after much or all of the survey is completed. The cost of re-running the survey or the portions of the survey may not be justifiable.

BRIEF SUMMARY OF THE DISCLOSURE

The invention more particularly relates to a method of source separating composite seismic data that includes signals from two or more seismic sources where composite seismic data is created by delivering seismic energy into the earth with at least two coded seismic sources operating simultaneously or nearly simultaneously (that is to say, the sources are transmitting their signal sweeps substantially concurrently such that source distinction is based principally on phase differences versus other bases of distinction such as frequency separation) and receiving seismic data from the at least two sources with at least one seismic receiver and recording the seismic energy received by the seismic receiver as composite seismic data. A segment of the composite seismic data is selected and a first estimated source signature applied to the earth by each of the at least two seismic sources is used as a seed to invert the segment of the composite seismic data and create a first inversion. An error from the first inversion reflecting the source generated data contamination between the at least two seismic sources based on the output of the first inversion is computed and the first estimated signature of the source signature applied to the earth by each of the at least two seismic sources is revised to create a second estimated signature applied to the earth. The segment of the composite seismic data is then re-inverted at least once to create a revised inversion using the second source signature estimate as a seed for the revised inversion and an error from the revised inversion is computed reflecting the source generated data contamination between the at least two seismic sources based on the output of the revised inversion. A preferred source signature estimate is selected having a low computed error and the composite seismic data is inverted using the preferred source signature estimate.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The invention relates to a process to separate simultaneously or near simultaneously activated seismic data sources where the separation method requires as one component that the seismic source signature be uniquely or distinctly coded in some manner. This covers data that includes signals from at least two sources and typically three or four sources where source separation is necessary for geophysical analysis. Specifically, the present invention is an analytical technique that quickly creates a more accurate source signature delivered by analysis of the source generated data contamination present in the separated data where such data contamination is the presence of one source's energy in another source's data after separation. The technique is to invert a segment of the data using a seed source signature and compute an error that reflects the data contamination observed in the separated source data. The source signature is iteratively revised as the segment is continually inverted with the goal of finding the optimal source signature that provides the lowest computed error. The source signature that provides the lowest error is, or is very close to, the true source signature and is then used in the separation process for the entire composite data set.

Acquisition techniques such as HFVS (U.S. Pat. Nos. 5,550,786, 5,715,213, and 5,721,710), ZenSeis® geophysical prospecting systems (U.S. Pat. No. 7,295,490), Unique Composite Relatively Adjusted Pulse (U.S. Ser. No. 61/365,631, filed Jul. 19, 2010) and Continuous Composite Relatively Adjusted Pulse (U.S. Ser. No. 61/365,663, filed Jul. 19, 2010), all of which are incorporated herein, are examples of acquisition techniques that utilize coded source signatures to aid in the separation of usable seismic data resulting from the simultaneously or near simultaneously activation of multiple seismic source. The seismic acquisition methods Unique Composite Relatively Adjusted Pulse and Continuous Composite Relatively Adjusted Pulse used pulse sources to encode unique source signatures. The examples of HFVS and ZenSeis® geophysical prospecting systems utilize vibrator type sources and are better known in industry and are the easiest examples of the application of this present invention. For this reason vibrator energy sources will be used as the example for explaining this invention, but it should be understood that the invention is applicable to any type of multiple encoded seismic source system where source separation is to be accomplished.

Figure 1:
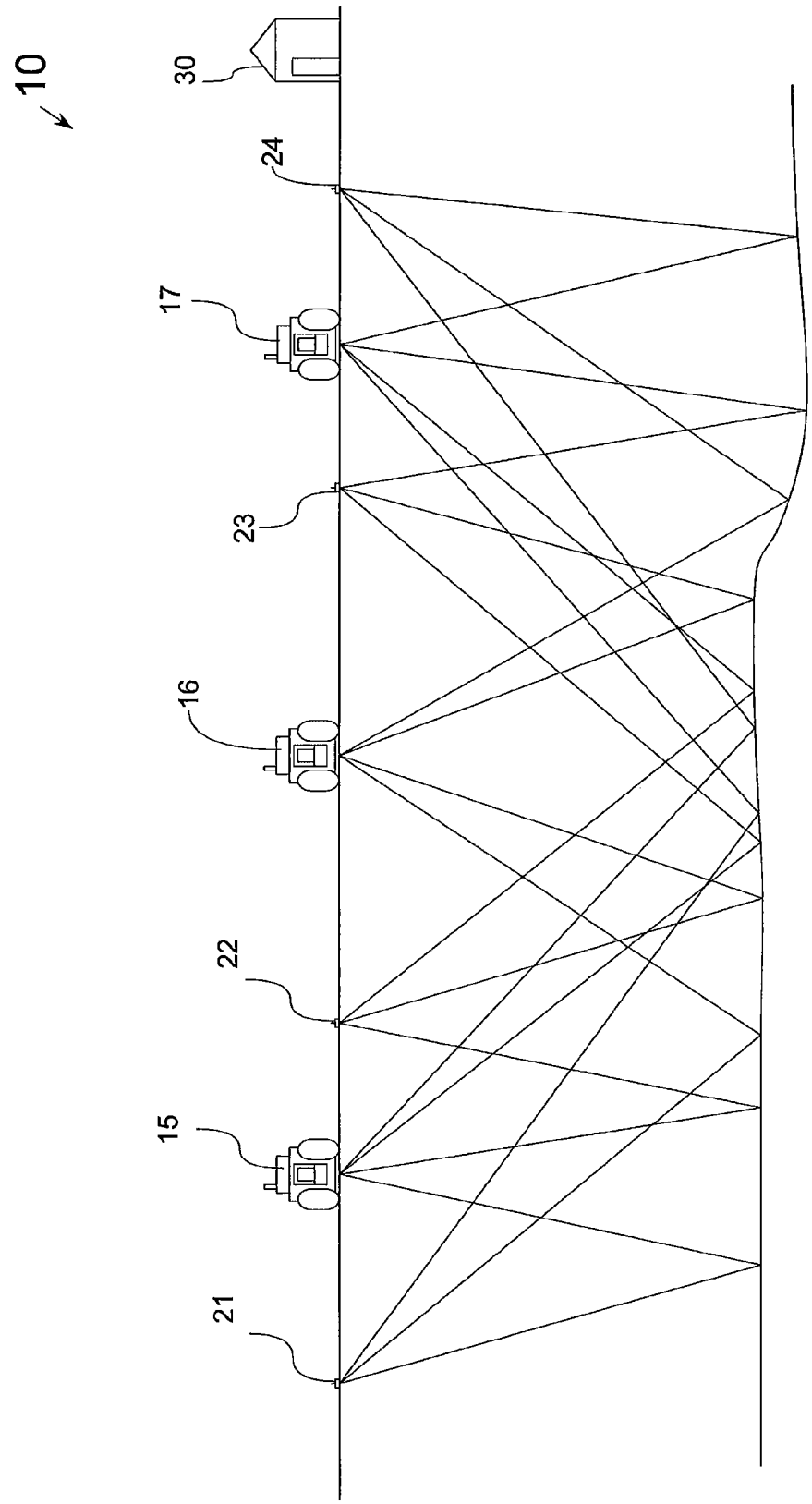
FIG. 1 is a fragmentary, cross-sectional view of the earth with three vibratory seismic sources emitting seismic energy into the earth and recording the returning wavefield at four receiver locations.

As shown in FIG. 1, a seismic acquisition system 10 is shown comprising three seismic vibrators 15, 16 and 17 along with receivers 21, 22, 23, and 24. All of the receivers 21-24 provide the received signals to recording system 30 either by direct hard wire as it is received or by download sometime after the recorded event such as in the case of autonomous node type recorders. The acquisition system 10 as shown is a simple representation of the source and receiver configuration used for a typical seismic acquisition project using the HFVS or ZenSeis® geophysical prospecting systems where the sources are activated simultaneously or near simultaneously creating a composite seismic record with all sources contributing. In such methods each source must be activated as many times at the same location as there are sources that will be activated simultaneously or near simultaneously creating a composite seismic record of each activation. These composite seismic records along with an estimated source signature, typically a computed ground force estimate, are input to an inversion program that separates the composite seismic records in to records that primarily only have seismic data resulting from one of the activated sources. Basically, the output of the inversion is one seismic data record for each activated source. Typically, the location of each activated source can be identified to some extent in each of the other seismic data records after inversion. This is referred to as source generated data contamination and is not desirable.

As discussed above the data traces of each of the receivers is a composite of all of the upcoming wavefield response from the subsurface geology. The best processing and interpretation of the data comes from analysis of signals that are individualized to each source at each source point. Thus, it is very desirable to separate each of the signals within the composite data traces into data traces that are attributable to a single source with minimal signal from the other sources. The conventional technique for source separation is to use the estimated ground force derived from the vibe controller in an inversion of the composite data for the individual shot records. The ground force imparted into the earth by the vibrator source is also the signature of the source and is referred to as the source signature. The estimated ground force is data provided by the vibe controller based on the output of the hydraulic systems and the accelerometers that are mounted on the reaction mass and baseplate. Conventional vibrator technology uses a weighted-sum method to estimate the ground force during a sweep. In 1984, Sallas derived the weighted-sum method to approximate the true ground force. See J. J. Sallas, Seismic Vibrator Control and the Downgoing P-Wave, GEOPHYSICS 49(6) (1984) 732-40. The weighted-sum method assumes that a baseplate acts as a rigid body, and that a full coupling between the baseplate and the ground is achieved. Under these assumptions, the weighted-sum ground force is obtained by summing weighted baseplate and reaction mass accelerations. The Sallas approximation or equation may be written as:

$$-F_g = M_r A_r + M_b A_b,$$

where $M_r$=Mass of the reaction mass (kg); $M_b$=Mass of the baseplate (kg); $A_r$=Reaction mass acceleration (m/s$^2$); $A_b$=Baseplate acceleration (m/s$^2$); and $F_g$=Compressive force exerted on the earth by the baseplate (N). This is normally reported as the ground force of the vibrator. It is known that there is a significant amount of error in this method of computing ground force data, but conventional inversion has been able to provide reasonably good interpretations of source separation if the proper non-orthogonal phase encoding is used.

In evaluating the performance of seismic sources, the inventors have been using load cell sensors to provide a measurement of the true ground force, the actual source signature that represents what the baseplate is truly and actually imparting into the earth. It turns out that the Sallas approximated ground force is quite a bit different than what is actually measured from under the baseplate. Unfortunately, what is imparted into the ground also varies substantially depending on the type of soil which the baseplate applies its forces. And the time it takes to create true ground force data is unacceptably long to use in the field. Even creating some data at varying locations would prolong the survey and substantially add to the cost.

It has been considered to create a portfolio of true ground force data to correlate to the estimated ground force data currently provided by the vibes, but even that has its issues in the measurements can be made using the load cells on various types of soil, but the variations also depend on what is just beneath the surface and also depends things that vary such as ground moisture content. The true ground force also depends on individual vibes and the exact location of the baseplate to ground interface. Fortunately, it turns out that the true ground force is actually available in the recorded data. It just needs to be teased out to obtain an optimal ground force estimate or what can also be called an optimal source signature. This optimal source signature better represents the true ground force which is the signature that the source actually put into the earth's surface.

Taking the overall recorded composite data setup and performing a standard inversion using the ground force estimate provided by the vibe controller as the seed, the matrix computation will provide a shot record for each source location. However, at the other vibe locations in the setup, there will be some source generated noise or data contamination present in the inverted record.

Figure 2:
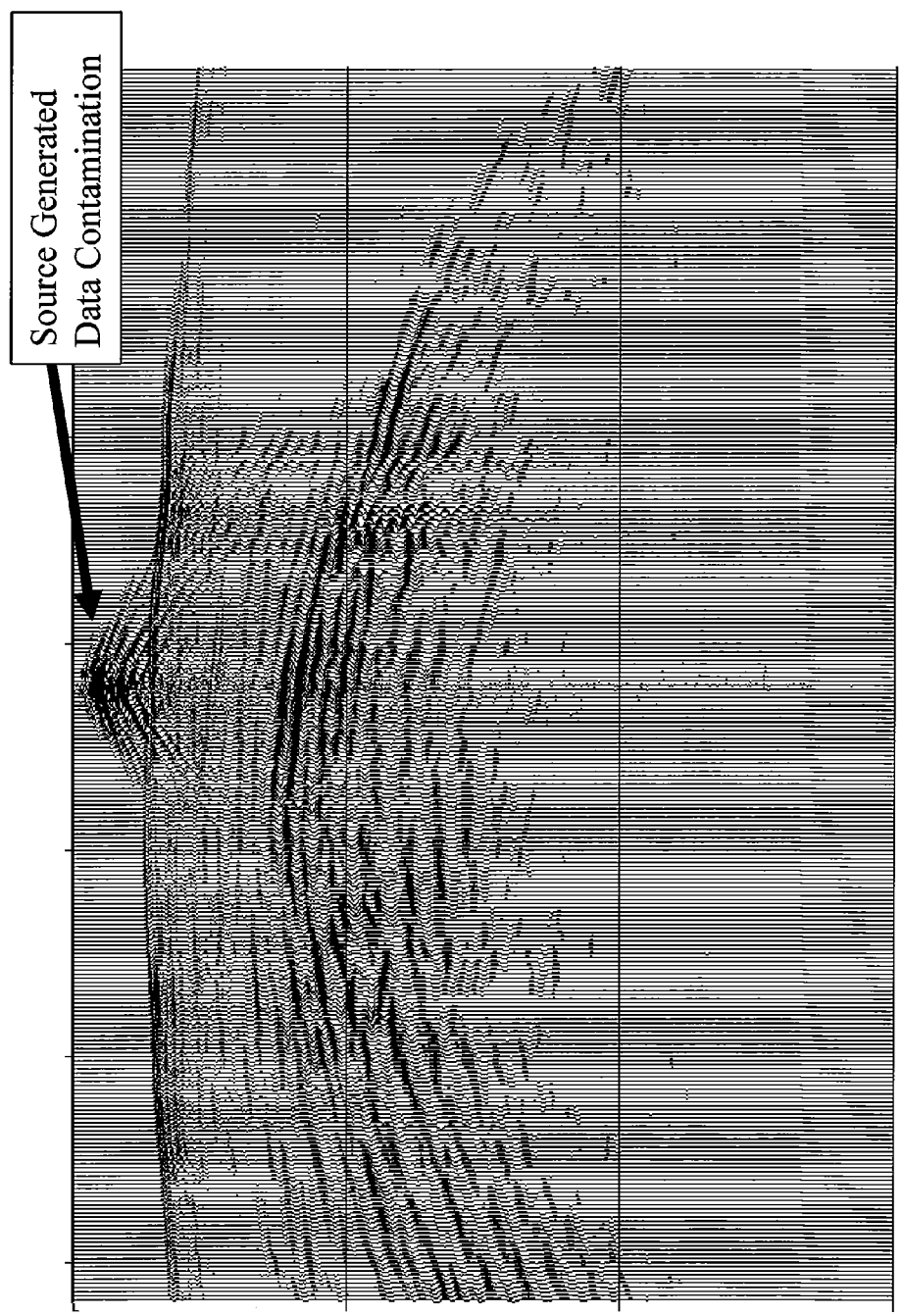
FIG. 2 is an output seismic data record from one source resulting from the inversion of simultaneously acquired data using the ZenSeis® geophysical prospecting system showing source generated data contamination.

FIG. 2 shows an example of source generated data contamination in an inverted seismic data record. The input data to the inversion process was acquired using the ZenSeis® geophysical prospecting systems where vibrators were activated simultaneously and then by using the estimated ground force data trace from each vibrator combined with the composite seismic record the inversion process separated the seismic data records for each vibrator. Only one of the seismic data records output from the inversion process is illustrated in FIG. 2, but the data contamination is readily apparent above the step out plane of real data. The contamination also has a distinctive step out angle as compared to the data from the specific source and obscures the actual desired data.

This data contamination has been determined to be related to incorrectly using the vibe controller derived ground force as a proxy of what really was input into the ground as the true ground force. Using this source generated data contamination noise at each source location, an error computation may be derived in the matrix calculations based on similarity of the separated data traces to the other inverted shot records. Similarity means there is source generated data contamination noise and the composite data has not been accurately separated. With the inversion output, a revision to the ground force estimate is created and used as a revised seed in the inversion of the data. Based on the revised inversion a new error computation is made and another revision to the ground force derived from each vibe is made. The data is then iteratively inverted with continuously revised ground source estimate numbers for each of the source locations until the error computations have reached a set minimum value.

The optimized ground force estimate that produced the lowest computed source generated data contamination error is then used for the inversion of the shot records and the process moves to the next setup. What has essentially occurred is that the full data set is processed with a more accurate ground force data estimate based on some relatively quick computational analysis. Since the optimized ground force estimate reduces the source generated data contamination to a minimum, the quality of the output is far more accurate and provides far better data for geophysical analysis.

The most powerful benefit of this invention is that there is a lot of seismic data that has been acquired and been processed using ground force estimates that have hampered accuracy. With this present invention, the existing data may be re-processed to provide much more accurate images of the subsurface structures and lead to far better geophysical interpretation. New hydrocarbon opportunities may be identified and areas where exploration dollars are about to be spent may be saved.

Figure 3:
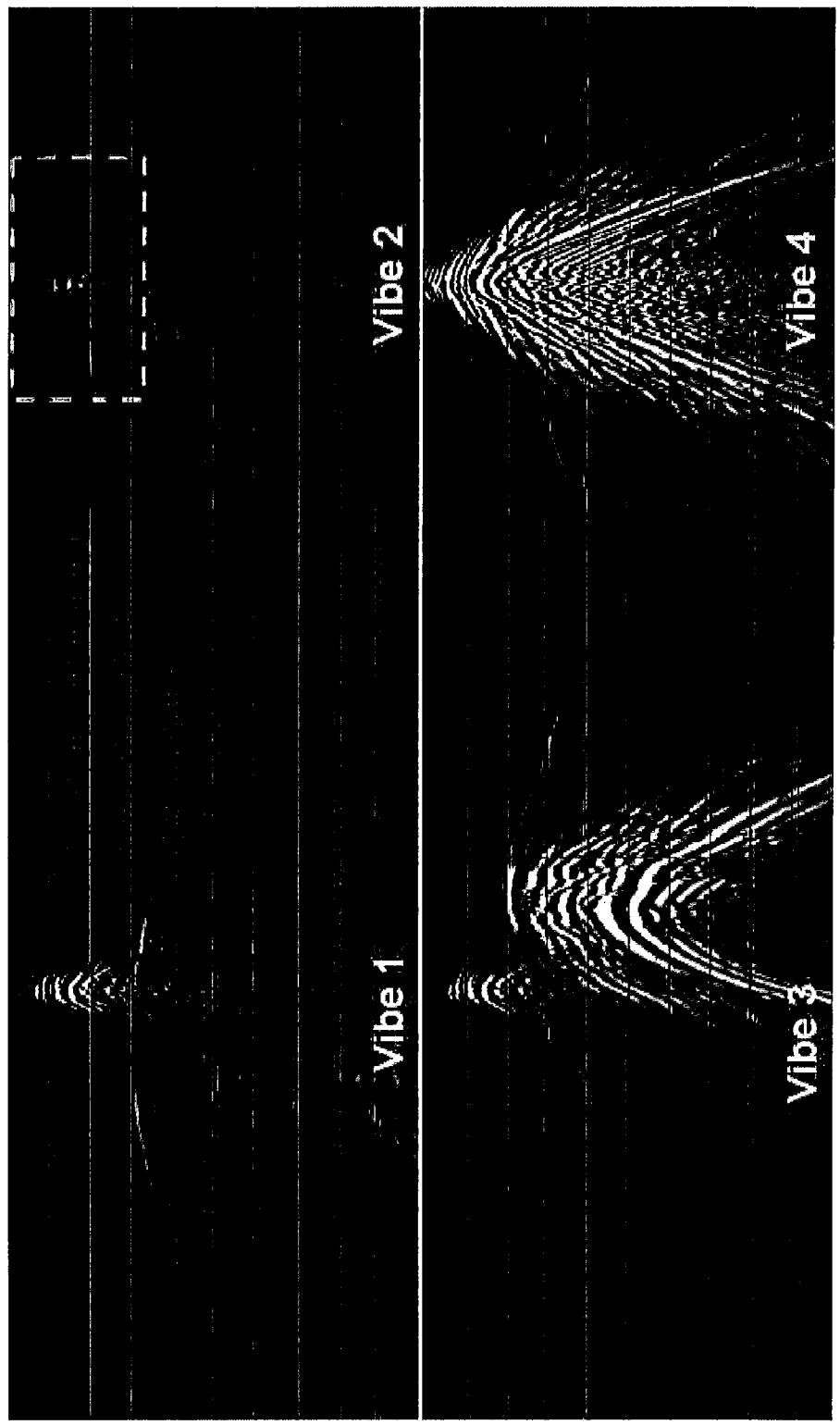
FIG. 3 is a seismic data record after inverting using the computed estimated ground force showing source generated data contamination from Vibe 4 in the records for Vibes 1, 2 and 3.

FIG. 3 is a seismic data record from a an actual seismic survey where four vibrators simultaneously acquired data set where the four vibrators were on four spatially separated earth surface positions and each vibe was activated to produce four sweeps. The result was four composite seismic records and the associated computed estimated ground force data traces for input in to the inversion process. The seismic data records are inverted using the estimated ground force data obtained from the vibrator control system. The data contamination from Vibe 4 is clearly visible on the other shot records. This level of contamination is not desirable and can be reduced by optimizing the ground force estimate used in the inversion to better represent the true ground force of Vibe 4.

Figure 4:
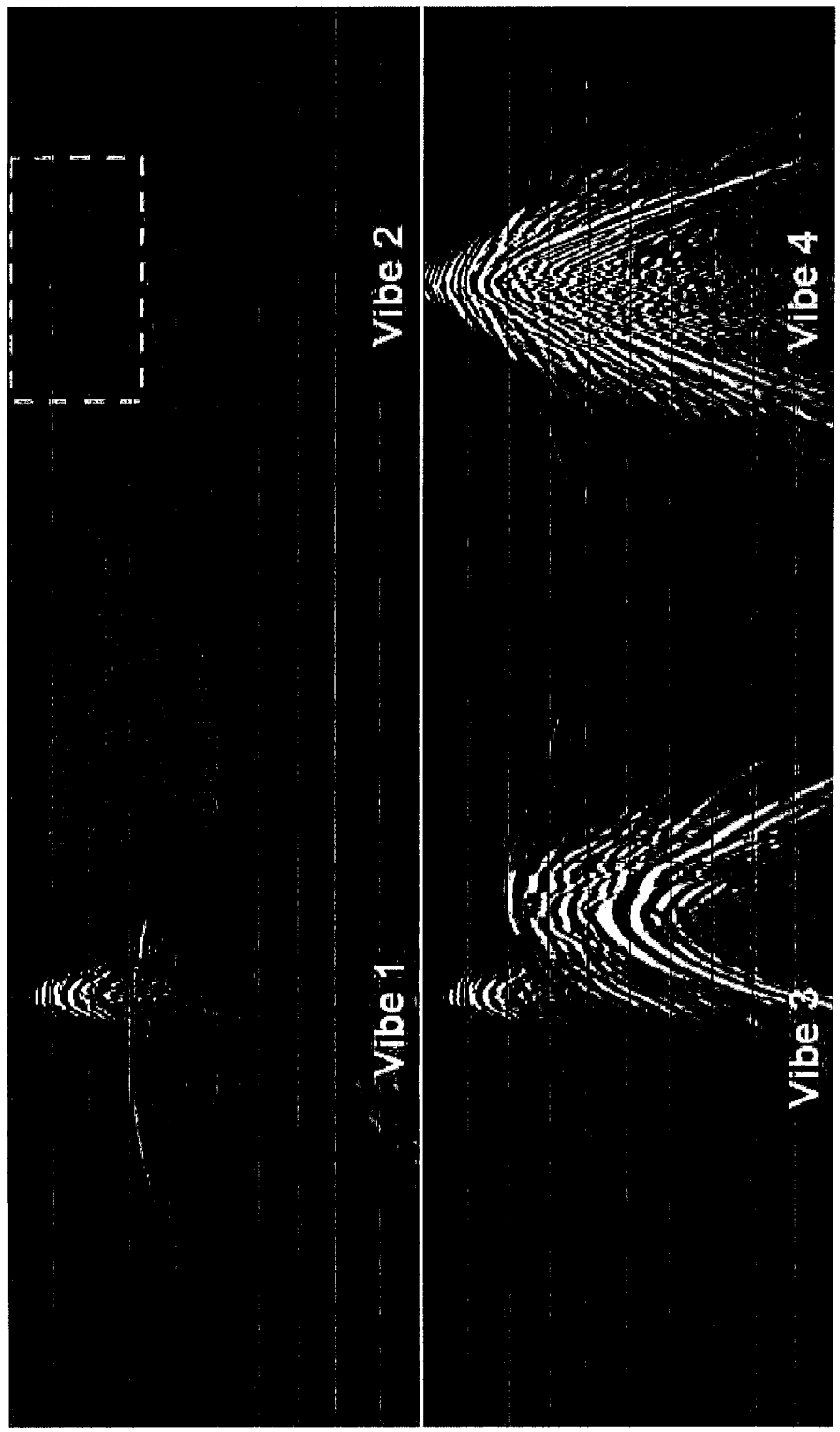
FIG. 4 is the seismic data record from FIG. 3 after inverting using the computed estimated ground force for a simultaneously acquired data set but with the computed ground force estimate for the fourth sweep of Vibe 4 rotated in phase by 1.5 degrees prior to inversion where the source generated data contamination in Vibe 2 is substantially diminished thereby suggesting that the revised ground force estimate at 1.5 degrees more accurately represents the signal that Vibe 4 actually put into the ground.

FIG. 4 is the same seismic data record a shown in FIG. 3 with the $4^{th}$ sweep of Vibe 4 rotated in phase by positive 1.5 degrees prior to the inversion process. FIG. 4 show the inversion results with the data contamination from Vibe 4 in the Vibe 2 seismic record being clearly reduced when compared to that indicated in FIG. 3.

In FIGS. 3 and 4, only a minor shift change occurred, in this case a constant phase rotation, to one of the measured ground force estimate signatures, but a significant reduction in the data contamination between the sources in the extracted shot records was accomplished. This is only one simple bulk shift of one of the 16 elements of a four by four inversion matrix of the source signatures. A bulk shift is a much less precise correction than a time and frequency varying shift which would likely lead to better source separation. Further improvement is believed to be obtainable by further optimization of the optimal ground force signature.

In the simplest embodiment of the invention, the quality control data produced by the vibrator control electronics during the vibrator operation is reviewed by the seismic processors for systematic phase errors. Typical vibrator control systems produce significant quantities of quality control data that is available for review such as average phase, peak phase, average distortion, peak distortion, average force, peak force, ground viscosity and ground stiffness. A review of this data provides information that can be used to estimate a correction phase factor to apply to specific vibrator source signature traces prior to input with the recorded seismic data for the inversion process. The inverted data can be reviewed and compared to inverted data without the phase factor correction applied to the specific source signature trace data. If the results do not appear optimum the phase correction can be adjusted and the inversion repeated. This is a manual iterative process that relies on the human seismic processor to make determinations and adjustments.

In the second embodiment of the invention an automated iterative loop that uses as a seed the estimated ground force from the Sallas approximation or similar method calculated from the data provided by the vibrator electronics is used as the source signature. In this realization, data is inverted using the estimated ground force and the resulting trace data is analyzed for source generated data contamination. The analysis of the inverted data will yield information on the frequency dependent phase error if it exists. Because of the volume of data available for each inversion, a matrix solution approach can be used to find a solution that sets the frequency dependent phase error correction that should be applied for each vibrator. The frequency dependent phase error correction is applied to the estimated ground force and the inversion of the seismic data is repeated. This loop is repeated until the frequency dependent phase error is determined to be at an acceptable minimum level.

In the third embodiment of the invention, an automated iterative loop that uses as a seed the pilot sweep used to guide the vibrator output. In this case the pilot sweep is an ideal source signature that is not computed from the actual vibrator electronics outputs. In this realization, data is inverted using the pilot sweep and the resulting trace data is analyzed for source generated data contamination. The analysis of the inverted data will yield information on the frequency dependent phase error if it exists. Because of the volume of data available for each inversion a matrix solution approach can be used to find a solution that sets the frequency dependent phase error correction that should be applied for each vibrator. The frequency dependent phase error correction is applied to the pilot sweep and the inversion of the seismic data repeated. This loop is repeated until the frequency dependent phase error is determined to be at an acceptable minimum level.

The embodiments listed concentrate on correcting the frequency dependent phase error that has been identified as a major factor in the level of source generated data contamination observed in data acquired using HFVS, ZenSeis® geophysical prospecting systems or similar seismic acquisition methods. Other simultaneous or near simultaneous acquisition methods that use source signature data as an integral part to an inversion or other source separation method can benefit from this source signature error correction method. Additionally other errors in the source signature may also contribute to the source generated data contamination such as amplitude variation, non-linear sweep rates and electronic instrument response differences. This method can be used to estimate corrections for the source signatures that result from these and other issues. Depending on the seismic data set being utilized one or more factors that contribute to the source signature error may be considered independently or simultaneously.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of source separating, with the aid of a digital computer, composite seismic data that includes signals from two or more seismic sources wherein the method comprises:
 a) creating composite seismic data by delivering seismic energy into the earth with at least two coded seismic sources operating simultaneously or nearly simultaneously and receiving seismic data from the at least two sources with at least one seismic receiver and recording the seismic energy received by the seismic receiver as composite seismic data;
 b) selecting a segment of the composite seismic data;
 c) using a first estimated source signature applied to the earth by each of the at least two seismic sources as a seed to invert the segment of the composite seismic data and create a first inversion;
 d) computing a first error from the first inversion, wherein the first error reflects source generated data contamination;
 e) revising the first estimated signature of the source signature applied to the earth by each of the at least two seismic sources to create a second estimated signature applied to the ground;
 f) re-inverting the segment of the composite seismic data at least once to create a revised inversion using the revised source signature estimate as a seed for the revised inversion;
 g) computing an error from the revised inversion, wherein the error reflects source generated data contamination;
 h) selecting a preferred source signature estimate having a low or an acceptable level of computed error;
 i) performing an inversion on the composite seismic data using the preferred source signature estimate; and
 j) generating a geological model based on the inversion.

2. A method of source separating composite seismic data that includes signals from two or more seismic sources in accordance with claim 1, wherein the composite seismic data includes data from at least three seismic sources.

3. A method of source separating composite seismic data that includes signals from two or more seismic sources in accordance with claim 1, wherein the composite seismic data includes data from at least four seismic sources.

4. A method of source separating composite seismic data that includes signals from two or more seismic sources in accordance with claim 1, wherein the composite seismic data includes data from at least five seismic sources.

5. A method of source separating composite seismic data that includes signals from two or more seismic sources in accordance with claim 1, wherein the composite seismic data includes data from at least six seismic sources.

6. A method of source separating composite seismic data that includes signals from two or more seismic sources in accordance with claim 1, wherein the composite seismic data includes data from at least ten seismic sources.

7. A method of source separating composite seismic data that includes signals from two or more seismic sources in accordance with claim 1, wherein the composite seismic data includes data from at least twenty seismic sources.

8. A method of source separating composite seismic data that includes signals from two or more seismic sources in accordance with claim 1, wherein the composite seismic data includes data from at least fifty seismic sources.

9. A method of source separating composite seismic data that includes signals from two or more seismic sources in accordance with claim 1, wherein the step of revising the first estimated signature comprises making a phase factor correction to the signature.

10. A method of source separating composite seismic data that includes signals from two or more seismic sources in accordance with claim 1, wherein the step of revising the first estimated signature comprises making a frequency dependent phase factor correction to the signature.

11. A method of source separating composite seismic data that includes signals from two or more seismic sources in accordance with claim 10, wherein the step of using a first estimated source signature as a seed for inverting the segment of composite seismic data comprises using the estimated ground force provided by a vibratory seismic source as the first estimated source signature.

12. A method of source separating composite seismic data that includes signals from two or more seismic sources in accordance with claim 10, wherein the step of using a first estimated source signature as a seed for inverting the segment of composite seismic data comprises using a pilot sweep as provided to a vibratory seismic source as the first estimated source signature.

13. A method of source separating composite seismic data that includes signals from two or more seismic sources in accordance with claim 1, wherein the sources are marine sources.

14. A method of source separating composite seismic data that includes signals from two or more seismic sources in accordance with claim 1, wherein the sources are land based sources.

15. A method of source separating composite seismic data that includes signals from two or more seismic sources in accordance with claim 1, further including the step of iteratively revising the source signature estimate and inverting the segment and computing an error with a focus on reducing the error until further revision of the source signature estimate produces low error levels and selecting a preferred source signature estimate from this iterative revision, inversion and computation step.

16. A method of source separating composite seismic data that includes signals from two or more seismic sources in accordance with claim 1, wherein the step of selecting a segment includes selecting a segment having source generated data contamination noise from one or more sources in data traces that should comprise data from only a single source.

17. A method of source separating composite seismic data that includes signals from two or more seismic sources in accordance with claim 1, wherein the step of selecting a segment more specifically includes selecting the composite seismic data in its entirety the step of performing an inversion on the composite seismic data using the preferred source signature estimate may comprise selecting an inversion that has been completed in the step of re-inverting the data.

* * * * *